United States Patent
Cochran

(10) Patent No.: US 10,072,144 B2
(45) Date of Patent: Sep. 11, 2018

(54) USE OF STYRENE METHYL METHACRYLATE COPOLYMERS (SMMA) AS COMPATIBILIZING AGENTS

(71) Applicant: INEOS STYROLUTION GROUP GMBH, Frankfurt (DE)

(72) Inventor: Thomas W. Cochran, Channahon, IL (US)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/117,362

(22) PCT Filed: Feb. 9, 2015

(86) PCT No.: PCT/EP2015/052603
§ 371 (c)(1),
(2) Date: Aug. 8, 2016

(87) PCT Pub. No.: WO2015/118141
PCT Pub. Date: Aug. 13, 2015

(65) Prior Publication Data
US 2017/0260380 A1    Sep. 14, 2017

(30) Foreign Application Priority Data
Feb. 10, 2014   (EP) .................................. 14154423

(51) Int. Cl.
*C08L 25/06*   (2006.01)
*C08L 25/14*   (2006.01)
*C08L 51/04*   (2006.01)
*C08L 67/04*   (2006.01)

(52) U.S. Cl.
CPC ......... *C08L 25/06* (2013.01); *C08L 2205/025* (2013.01); *C08L 2205/03* (2013.01); *C08L 2205/035* (2013.01); *C08L 2205/08* (2013.01)

(58) Field of Classification Search
CPC .......... C08L 25/04; C08L 25/06; C08L 67/04; C08L 2205/025; C08L 2205/03; C08L 2205/035; C08L 2205/08
See application file for complete search history.

(56) References Cited

U.S. PATENT DOCUMENTS

| 6,031,053 A | 2/2000 | Knoll et al. | |
| 6,197,889 B1 | 3/2001 | Knoll et al. | |
| 2007/0269670 A1* | 11/2007 | Wilmer | G11B 7/253 428/500 |
| 2009/0234035 A1 | 9/2009 | Cheung et al. | |
| 2012/0252977 A1* | 10/2012 | Zhu | C08L 67/04 525/64 |
| 2012/0289656 A1* | 11/2012 | Knoeppel | C08L 25/08 525/99 |
| 2013/0310506 A1* | 11/2013 | Kim | C08K 5/1539 524/502 |
| 2015/0183917 A1 | 7/2015 | Knoll et al. | |

FOREIGN PATENT DOCUMENTS

| EP | 0766706 A1 | 4/1997 |
| EP | 0859803 A1 | 8/1998 |
| WO | 2012/117040 A1 | 9/2012 |
| WO | 2014/001233 A1 | 1/2014 |
| WO | WO-2014194391 A1 * | 12/2014 |

OTHER PUBLICATIONS

Properties of Polylactic acid downloaded from https://plastics.ulprospector.com/generics/34/c/t/polylactic-acid-pla-properties-processing on Oct. 12, 2017.*
Properties of Polystyrene downloaded from http://polymerdatabase.com/polymer%20classes/Polystyrene%20type.html on Oct. 12, 2017.*
P. Sarazin and B. D. Favis, "Morphology COntrol in Co-continuous Poly(L-lactide)/Polystyrene Blends: A Route towards Highly Structured and Interconnected Porosity in Poly(L-lactide) Materials," Biomacromolecules, 2003, 4, pp. 1669-1679.

* cited by examiner

*Primary Examiner* — Irina S Zemel
*Assistant Examiner* — Jeffrey S Lenihan
(74) *Attorney, Agent, or Firm* — J.A. Lindeman & Co., PLLC

(57) ABSTRACT

Polymer blends comprising (A) at least one polystyrene (co)polymer other than styrene methyl methacrylate copolymer (SMMA), (B) at least one poly(lactic acid) (PLA) and (C) at least one styrene methyl methacrylate copolymer (SMMA) have advantageous properties.

16 Claims, No Drawings

USE OF STYRENE METHYL METHACRYLATE COPOLYMERS (SMMA) AS COMPATIBILIZING AGENTS

The present invention relates to a polymer blend comprising (A) at least one polystyrene (co)polymer, other than styrene methyl methacrylate copolymer (SMMA), (B) at least one poly(lactic acid) (PLA) and (C) at least one styrene methyl methacrylate copolymer (SMMA). The present invention further relates to the use of SMMA for compatibilizing a polymer blend comprising a polystyrene (co) polymer and PLA. Moreover, an object of the present invention is a method of producing a polymer blend according to the present invention. Furthermore, the present invention embraces a product comprising a polymer blend according to the present invention.

Some of the most frequently used and most important thermoplastics are polystyrene (co)polymers. Several polystyrene (co)polymers such as general purpose polystyrene (GPPS) and rubber modified high impact polystyrene (HIPS) are used worldwide in an annual scale of billions of tons in a large variety of applications. Many polystyrene (co)polymers, such as the aforementioned GPPS and HIPS, are known to bear desired properties, such as high toughness, elasticity and flexibility. They are regularly used in numerous products such as, e.g., plastics moldings, packing materials (accredited for food and beverage packing), fiber, yarn, fabric, tissue and other consumer products, but also for medical applications such as, e.g., as tubings, micro- or nanobeads and implants. Due to their beneficial properties, polystyrene (co)polymers may also be used in composite materials and may be processed to film materials and foams. Polystyrene (co)polymers are regularly comparably inert to chemical and biological influences and resistant to atmospheric attack. Thus, polystyrene (co)polymers are poorly biodegradable.

Ecological sustainability gains increasing importance. This also applies to consumer products, including those made from or containing thermoplastic materials. In this field, it is particularly intended to reduce the amount of waste by using increasing amounts of biodegradable thermoplastics.

One of the biodegradable plastics usable in industrial applications so far is poly(lactic acid) (PLA). The monomers of PLA, i.e., lactic acid, can even be obtained from renewable resources what improves sustainability even further. Today, molding products made of thermoplastic PLA are exemplarily used for single use packaging, such as for food packing. Exemplarily, food containers such as yoghurt cups are made of polymer blend comprising PLA.

However, despite the advantage of biodegradability, the applications for PLA are hampered by its rather brittle nature and general lack of appealing mechanical properties, particularly toughness, elasticity and flexibility.

In the view of the above, it seems desirable to replace a part of the essentially nonbiodegradable polystyrene (co) polymers by a biodegradable polymer, such as PLA by admixing portions of PLA to polystyrene (co)polymers, thus, generating PLA/polystyrene (co)polymer blends. For years, it has been tried to generate PLA/polystyrene (co) polymer blends, but the results were not satisfying.

PLA/polystyrene (co)polymer blends with suitable properties, thus, with a feasible toughness, elasticity and flexibility, could not be obtained so far. It was not even achieved to obtain a suitably homogeneous blend comprising PLA and polystyrene (co)polymer. The obtained blends comprising PLA and polystyrene (co)polymer unfortunately tended to decompose and segregate upon processing. In particular when heating a mixture comprising PLA and polystyrene (co)polymer upon the glass transition temperature (Tg), the polymer mixtures segregate and de-compatibilize into a PLA and a polystyrene (co)polymer phase.

The person skilled in the art knows that the use of larger amounts of small molecular weight amphiphilic emulsifiers in a polymer mass is generally to be avoided because many small molecular weight emulsifiers are either degraded upon processing the polymer blend, are toxic and/or are washed out of the final product by aqueous and/or fatty solutions.

In summary, the attempts of admixing PLA to polystyrene (co)polymers have not led to suitable essentially homogeneous polymer blends with good mechanical and optical properties. Accordingly, there is an unmet technical need for a compatibilizing agent to obtain suitable polymer blends comprising PLA and polystyrene (co)polymer, in particular such polymer blends comprising PLA and polystyrene (co) polymer bearing desirable technical properties such as suitable toughness, elasticity and flexibility.

Surprisingly, it was found that styrene methyl methacrylate copolymers (SMMA) are suitable compatibilizing agents for polymer blends comprising PLA and polystyrene (co)polymer. Herein, SMMA significantly improves the technical properties of such polymer blends, in particular with respect to toughness, elasticity and flexibility.

In a first aspect, the present invention relates to a polymer blend comprising:

(A) 25-89.5% (w/w) of at least one polystyrene (co)polymer other than styrene methyl methacrylate copolymer (SMMA);
(B) 10-50% (w/w) of at least one poly(lactic acid) (PLA);
(C) 0.5-20% (w/w) of at least one styrene methyl methacrylate copolymer (SMMA); and optionally
(D) 0-5% (w/w) of one or more additive(s).

Preferably, throughout the present invention, the portions indicted as "% (w/w)" (i.e., % weight per weight) of components (A), (B), (C) and (D) sum up to 100% (w/w).

As used herein, the term "polymer blend" may be understood in the broadest sense as any mixture of three or more polymers and, optionally additive(s), i.e., comprising at least the following components (A), (B) and (C), namely (A) at least one polystyrene (co)polymer other than SMMA, (B) at least one PLA and (C) at least a one SMMA in the portions according to the present invention. Typically, the polymer blend will bear different physical and/or chemical characteristics in comparison to the unblended polymers, independent from another.

Preferably, a polymer blend in the context of the present invention may be a miscible polymer, i.e., a polymer blend bearing a single-phase structure and, preferably, maintains such single-phase structure when processed (e.g., heated above the glass transition temperature Tg). Such polymer blend may also be designated as essentially homogenous polymer blend. Homogenous means that the components of the blend are essentially evenly distributed throughout the polymer blend and there are no macroscopically separated phases, i.e., no structures of phase separations larger than 0.1 mm, preferably no structures larger than 0.05 mm, observable. The optical and haptic appearance of a polymer blend according to the present invention may, preferably, be smooth and uniform. The polymer blend may be transparent/pellucid or nontransparent/opaque. Preferably, a layer of not more than 0.5 mm thickness of the polymer blend is at least partly translucent.

The polymer components according to the present invention may be homopolymers (i.e., a polymer comprising essentially a single type of monomer moieties) or a copolymers (i.e., a polymer comprising two or more types of monomer moieties). As used herein, the term "essentially a single type of monomer moieties" means that at least 80%, preferably at least 85%, more preferably at least 90%, even more preferably at least 95%, in particular at least 99% of the monomer moieties comprised in the polymer are such of a single type. Particularly preferably, the homo-polymer is an essentially pure polymer. As used herein, throughout the present invention term "essentially pure" in the context of a polymer indicates that it does not contain more than 0.75% (w/w), preferably not more than 0.5% (w/w), more preferably not more than 0.25% (w/w), in particular not more than 0.1% (w/w) other monomer moieties included in the polymer. Preferably, a homopolymer as used herein is an essentially linear polymer strand optionally comprising essentially no, few or some cross-linkages. Alternatively, a homopolymer may also be a branched polymer.

A copolymer as used herein is a polymer comprising two or more different types of monomers, thus, a polymer that is not understood as homopolymer. In a copolymer the different types of monomer moieties may be either evenly and homogeneously distributed over the copolymer (random copolymer) or may be located at a defined area of the polymer strand(s), i.e. in a block (block copolymer). As used herein, the term "block copolymer" may be understood in the broadest sense as any copolymer having a defined polymer structure.

Each (co)polymer according to the present invention may also contain one or more cross-linking moiety/moieties such as, e.g., divinylbenzene, in the polymer strands. Preferably, such cross-linking agents do constitute for not more than 25% (w/w) of the polymer mass, more preferably not more than 10% (w/w) of the polymer mass, even more preferably not more than 5% (w/w) of the polymer mass.

A (co)polymer according to the present invention (homopolymer or copolymer) may bear a linear or branched structure. As used herein, the term "branched structure" may be understood in the broadest sense any structure deviating from a plain linear structure. Accordingly, in a polymer of branched structure, there is at least one monomer binding to three or more other monomer(s).

Each (co)polymer component of the polymer blend according to the present invention (i.e., polystyrene (co) polymer other than SMMA, PLA and SMMA) may optionally comprise amounts of not more than 5% (w/w) of compounds not included in the polymer strand, thus, not covalently bound thereto or therein, such as, e.g., metals, cations, anions, fatty acids, weakeners, residuals of solvents etc.

Preferably, the polymer blend does not comprise more than 5% (w/w) of compounds not included in the polymer, more preferably not more than 2% (w/w), even more preferably not more than 1% (w/w), in particular not more than 0.5% (w/w).

These compounds not included in the polymer strand may be removed during processing the polymer blend (e.g. be means of one or more washing steps(s), one or more precipitation steps(s) or by means of thermal degradation) or may remain in the polymer blend as one or more additive(s).

The polystyrene (co)polymer other than styrene methyl methacrylate copolymer (SMMA) (component (A)) usable in the polymer blend according to the present invention may be any polystyrene (co)polymer other than SMMA known in the art. When the term "polystyrene (co)polymer" is used herein, a polystyrene (co)polymer other than styrene methyl methacrylate copolymer is meant, if not indicated otherwise.

As used herein, the term "at least one polystyrene (co) polymer other than styrene methyl methacrylate copolymer" indicates that there may optionally be only one type or different types of polystyrene (co)polymer(s) in the polymer blend of the present invention. Such different types of the polystyrene (co)polymers may, exemplarily, have different molecular weights, different melt flow indices (MFIs) and/or different comonomer or additive compositions. A single type of polystyrene (co)polymer may be polystyrene (co)polymer bearing essentially the same monomer moieties, i.e., contents of each monomer moiety +/−10%, a molecular weight (Mw) range of +/−10%, a melt flow index (MFI), determined at a temperature of 200° C. and at a load of 5 kg according to ASTM procedure D1238, of +/−1 g/10 min and an essentially comparable monomer moiety composition and distribution over the polymer strand. Different types of polystyrene (co)polymer(s) may vary in at least one of the aforementioned characteristics.

Preferably, the ASTM procedure D1238 is used in the version of the year 2013.

As throughout the invention, the term "molecular weight" or "Mw" may be understood in the broadest sense as the mass of a molecule or a section of a molecule (e.g., a polymer strand, a polymer block or a small molecule) provided in g/mol (Da) and kg/mol (kDa), respectively. Preferably, the molecular weight (Mw) may be the average weight in the population of molecules observed, i.e., the overall average of the molecular weight (Mw) of the molecules characterized by a certain Mw. The Mw is measured by known to the art methods.

A polystyrene (co)polymer other than SMMA according to the present invention may also contain one or more cross-linking moiety/moieties such as, e.g., divinylbenzene, in the polymer strands.

Optionally, a polystyrene (co)polymer other than SMMA may be a polystyrene homopolymer (polystyrene; PS) essentially consisting of polystyrene moieties, i.e., may be essentially pure polystyrene, optionally comprising one or more cross-linking moiety/moieties. Such polystyrene homopolymer may also be designated as general purpose polystyrene (GPPS).

Alternatively, polystyrene (co)polymer other than SMMA may also be a polystyrene copolymer, i.e., any type copolymer comprising polystyrene moieties. Such polystyrene copolymer may, next to polystyrene moieties comprise any other type of monomer moieties suitable to be included in a polymer with polystyrene moieties. The person skilled in the art will know that in particular such polymer moieties bearing a double bond between two carbon atoms (C=C) are suitable for such purpose. Preferably, a polymer moiety comprised in a polystyrene copolymer according to the present invention comprises a vinyl group (—CH=CH$_2$). Preferably, a polymer moiety comprised in a polystyrene copolymer according to the present invention bears a molecular weight of not more than 1000 Da, more preferably not more than 500 Da, in particular not more than 250 Da. In particular, a polymer moiety comprised in a polystyrene copolymer according to the present invention bears a vinyl group and a molecular weight of not more 250 Da.

Exemplarily, a polymer moiety comprised in a polystyrene copolymer according to the present invention may be acrylonitrile, butadiene, N-maleimide or alpha-methylstyrene, vinyl halogen (e.g., vinyl chloride, vinyl fluoride), vinyl acetate, an (meth)acryl other than methyl methacryl, ethylene, propylene, vinyl alcohol (e.g., ethanol, 2-propenol). Also mixtures of two or more of the aforementioned may be used in a polystyrene copolymer.

In a preferred embodiment, the at least one polystyrene (co)polymer (A) is selected from the group consisting of polystyrene, styrene acrylonitrile copolymer (SAN), acrylonitrile butadiene styrene copolymers (ABS), styrene butadiene copolymer (SB), styrene maleimide copolymer (SMC), styrene alpha-methylstyrene copolymer and mixtures of two or more thereof.

Preferably, the polystyrene (co)polymer other than SMMA may comprise high impact polystyrene (HIPS) and/or general purpose polystyrene (GPPS).

In a preferred embodiment of the present invention, at least one polystyrene (co)polymer (A) comprises at least one rubber modified high impact polystyrene (HIPS).

More preferably, the polystyrene (co)polymers comprised in the polymer blend according to the present invention comprise HIPS and GPPS. Particularly preferably, the polystyrene (co)polymer(s) according to the present invention comprises more than 50% (w/w) HIPS, more preferably, HIPS and GPPS in a mass ration of HIPS:GPPS between 50:50 and 95:5, more preferably of between 60:40 and 95:5, even more preferably of between 70:30 and 95:5, in particular of between 75:25 and 95:5.

In a particularly preferred embodiment, at least a part of the HIPS is a styrene butadiene block copolymer (SBC), in particular wherein the SBC has a dendrimer structure. A styrene butadiene copolymer is a copolymer comprising at least styrene and butadiene monomer moieties. Such styrene butadiene copolymer may preferably bear a branched or even a star-like structure. The person skilled in the art knows routes for obtaining styrene butadiene copolymers. A number of styrene butadiene copolymers are commercially available, such as Styroflex 2G66 (Styrolution Group GmbH, Germany). Examples for synthetic routes are depicted in EP-A 0 766 706, EP-A 0 859 803, WO 2012/117040 and WO 2014/001233. Blends of PLA with Styroflex 2G66 are of particular interest.

As used in the context of the styrene butadiene copolymer (SBC), the term "styrene" may be understood as styrene monomer moiety embedded into the molecular structure of the copolymer by covalent linkage(s).

Likewise, the term "butadiene" may be understood as butadiene monomer moiety embedded into the molecular structure of the copolymer by covalent linkage(s). It will be understood that upon including the styrene and the butadiene moieties into the copolymer, an aliphatic double bond of the monomers will typically disappear.

Optionally, the copolymer further comprises up to 40% (w/w) other comonomers, i.e., other monomer moieties covalently embedded into the polymer structure of the copolymer. The comonomer, as used herein may be any suitable comonomer known in the art.

Preferably, a comonomer is a vinyl monomer, i.e., a monomer bearing, before being covalently embedded into the styrene butadiene copolymer, at least one aliphatic double bond. Exemplarily, a comonomer may be ethylene, propylene, vinyl chloride, vinyl fluoride, polyvinyl alcohol or vinyl acetate.

As used in the context of the present invention, a styrene butadiene copolymer may be any styrene butadiene copolymer, in particular such comprising at least 50% (w/w) styrene, at least 10% (w/w) butadiene and not more than 40% (w/w) of other comonomers. The styrene butadiene copolymer may be a random styrene butadiene copolymer or may be a styrene butadiene block copolymer. Exemplarily, the styrene butadiene copolymer is a block copolymer. Exemplarily, a styrene butadiene copolymer may comprise 50-90%, often 50-85% (w/w) styrene moieties and 10-50%, often 15-50% (w/w) butadiene moieties and, optionally one or more type(s) of other comonomer(s).

Preferably, a styrene butadiene copolymer comprises at least 55% (w/w) styrene, more preferably at least 60% (w/w), even more preferably at least 65% (w/w), in particular at least 70% (w/w) styrene. Preferably, a styrene butadiene copolymer comprises not more than 90% (w/w) styrene, more preferably not more than 88% (w/w), even more preferably not more than 85% (w/w), in particular not more than 80% (w/w) styrene. Preferably, a styrene butadiene copolymer comprises 60-90% (w/w) styrene, more preferably 65-90% (w/w) styrene, even more preferably 65-88% (w/w) styrene, more preferably 65-85% (w/w) styrene, even more preferably 70-85% (w/w) styrene, even more preferably 70-80% (w/w) styrene, in particular 72-78% (w/w) styrene.

Preferably, a styrene butadiene copolymer comprises 5-45% (w/w) butadiene, more preferably 10-40% (w/w) butadiene, even more preferably 15-35% (w/w) butadiene, even more preferably 15-30% (w/w) butadiene, even more preferably 20-30% (w/w) butadiene, in particular 22-28% (w/w) butadiene. Preferably, a styrene butadiene copolymer comprises not more than 25% (w/w) of other comonomer(s), more preferably not more than 20% (w/w), even more preferably not more than 15% (w/w), even more preferably not more than 10% (w/w), even more preferably not more than 5% (w/w), in particular not more than 1% (w/w) or essentially no other comonomer(s).

Exemplarily, a styrene butadiene copolymer (SBC) may comprise:
A1) 50-85% (w/w) styrene,
A2) 15-50% (w/w) butadiene, and
A3) 0-25% (w/w) other comonomer(s).

Exemplarily, styrene butadiene block copolymers are described in WO 2012/117040 or WO 2014/001233.

A styrene butadiene copolymer may be an anionically produced block copolymer containing:
(i) at least one block of styrene-containing hard phase with a glass transition temperature (Tg)>70° C., and
(ii) at least one block of butadiene-containing soft phase with Tg<0° C.

One or more of the styrene-containing hard phase(s) may or may not comprise butadiene moieties at an amount of not more than 45% (w/w), preferably not more than 25% (w/w). One or more of the butadiene-containing soft phase(s) may or may not comprise styrene moieties at an amount of not more than 45% (w/w), preferably not more than 25% (w/w). A styrene butadiene copolymer may comprise at least one butadiene-containing soft-phase block comprising styrene in an amount of 1-45% (w/w) having an overall Tg<0° C. This means that in the butadiene-containing soft-phase block, there are at least some styrene moieties present. These may be randomly distributed in the butadiene-containing soft-phase block or be present in a higher concentration in a part of the butadiene-containing soft-phase block. These styrene moieties may preferably not form strands comprising ten or more consecutively adjacent styrene moieties.

As indicated above, it is an object of the present invention to provide blends comprising polystyrene (co)polymer other than SMMA (component (A)), in particular such as defined above, and poly(lactic acid) (PLA) (component (B)).

The poly(lactic acid) (PLA) (component (B)) usable in such polymer blends according to the present invention may be any PLA known in the art. PLA as used herein may be understood in the broadest sense as any polymer, mainly composed of lactic acid moieties, i.e., comprising more than 50% (w/w) of lactic acid moieties.

Preferably, PLA in the context of the present invention may be essentially pure PLA comprising essentially only lactic acid monomers or may be PLA comprising up to 10% (w/w), preferably not more than 8% (w/w), more preferably not more than 6% (w/w), even more preferably not more than 5% (w/w), even more preferably not more than 4% (w/w), even more preferably not more than 3% (w/w), even more preferably not more than 2% (w/w), in particular not more than 1% (w/w) of other monomer moieties included in the polymer.

The PLA may, optionally, comprise other monomer moieties, preferably other monomer moieties, which are conjugatable with lactic acid via an ester (—CO—O—), amide (—CO—NH—), thioester (—CO—S—) bond, in particular wherein said monomer moieties base on unconjugated moieties comprising both functional groups such as (i) a carboxyl group (—COOH, —COO−) and/or an activated carboxyl group (e.g., —COCl, active ester) and (ii) an hydroxyl group (—OH), an activated hydroxyl group (e.g., —ONa), an amino group (—$NH_2$) and/or an thiol group (—SH). Such polymer moiety may preferably be also biodegradable and may exemplarily be glucolide.

Preferably, the PLA has a melt flow index (MFI) (determined at a temperature of 210° C. and at a load of 2.16 kg according to ASTM procedure D1238) of less than 50 g/10 min, more preferably of less than 20 g/10 min, even more preferably of less than 10 g/10 min. In a preferred embodiment, the at least one PLA (B) has a melt flow index (MFI) of between 4 and 10 g/10 min (determined at a temperature of 210° C. and at a load of 2.16 kg according to ASTM procedure D1238). More preferably, PLA (B) bears a MFI of between 4 and 9 g/10 min, in particular of between 5 and 7 g/10 min.

As used herein, the term "at least one poly(lactic acid) (PLA)" indicates that there may optionally be only one type or different types of PLA(s) in the polymer blend of the present invention. Such different types of PLAs may, exemplarily, have different molecular weights, different melt flow indices (MFIs) and/or different comonomer or additive compositions. A single type of PLA may be PLA bearing a essentially the same monomer moieties, i.e., contents of each monomer moiety +/−10%, a molecular weight (Mw) range of +/−10%, a melt flow index (MFI) determined at a temperature of 210° C. and at a load of 2.16 kg according to ASTM procedure D1238 of +/−1 g/10 min and an essentially comparable monomer moiety composition and distribution over the polymer strand. Different types of PLA may vary in at least one of the aforementioned characteristics.

As indicated above, it is an object of the present invention to provide blends comprising polystyrene (co)polymer other than SMMA (component (A)), in particular such as defined above, and poly(lactic acid) (PLA) (component (B)), wherein the compatibilization of said blends in achieved by admixing styrene methyl methacrylate copolymer (SMMA) (component (C)).

The styrene methyl methacrylate copolymer (SMMA) (component (C)) usable in the polymer blend according to the present invention may be any SMMA known in the art.

As used herein, the term "at least one SMMA" indicates that there may optionally be only one type or different types of SMMA(s) in the polymer blend of the present invention. Such different types of SMMAs may, exemplarily, have different molecular weights, different melt flow indices (MFIs) and/or different comonomer or additive compositions. A single type of SMMA may be SMMA bearing a essentially the same monomer moieties, i.e., contents of each monomer moiety +/−10%, a molecular weight (Mw) range of +/−10%, a melt flow index (MFI) determined at a temperature of 200° C. and at a load of 5 kg according to ASTM procedure D1238 of +/−1 g/10 min and an essentially comparable monomer moiety composition and distribution over the polymer strand. Different types of SMMA may vary in at least one of the aforementioned characteristics.

The SMMA may have any monomer moiety composition mainly composed of styrene and methyl methacrylate moieties. In a preferred embodiment, the at least one SMMA (C) contains at least 50% (w/w) styrene, preferably 55-85% (w/w) styrene, more preferably 60-80% (w/w) styrene, even more preferably 70-80% (w/w) styrene, in particular about 70% (w/w) styrene. The SMMA may be a random polymer or a block polymer. In a preferred embodiment, the at least one SMMA (C) is a random polymer.

As noted above, the polymer blend according to the present invention may be composed of the aforementioned polymer components, i.e., polystyrene (co)polymer(s) other than styrene methyl methacrylate copolymer (SMMA) (component (A)), poly(lactic acid(s)) (PLA(s)) (component (B)) and styrene methyl methacrylate copolymer(s) (SMMA(s)) (component (C)) or may further comprise one or more additive(s) (component (D)).

The additive component (D) may be a polymer additive in the broadest sense or may be a non-polymer-like additive. Preferably, the additive, as used herein, is not a polymer. Preferably, the additive has either a wax/talcum-like appearance at normal conditions (20° C., 1013 mbar, no addition of solvents) and/or a molecular weight of not more than 5 kDa, in particular not more than 1 KDa. An additive as used in the context of the present invention may be any additive known for plastics in the art. The additive may be a stabilizer (e.g. a light stabilizer (e.g., an UV-absorber), a process stabilizer, or a radical scavenger, a phenolic primary stabilizer), a glossing agent, an antioxidant, a metal deactivator, an antistatic agent, a flow agent, an anti-sticking agent, metal ions, fatty acids, a pigment (e.g. carbon black), a strengthener, a filling agent (kaolin, chalk, astonite, talcum, calcium carbonate, one or more silicate(s), titan dioxide, zinc oxide, graphite, grapheme, glass particle(s), carbon nanotubes, aluminum oxide, and/or a flame retardant.

An additive as used herein may be added to the polymer blend on purpose or may result from the production process of either the polymer raw components and/or the blending process (e.g., as residual(s) from solvent(s), monomer(s), activator(s), precipitation and/or purification step(s), degradation products from monomer(s), activator(s) and/or other pyrolytic product(s)). The additive may be added upon blending the polymer raw components and/or may be comprised in one or more of the polymer raw component(s).

As mentioned above, the polymer blend according to the present invention may comprise 25-89.5% (w/w) of at least one polystyrene (co)polymer other than styrene methyl methacrylate copolymer (SMMA).

In a preferred embodiment, the polymer blend comprises 40-88% (w/w) of at least one polystyrene (co)polymer (A) other than SMMA, preferably 50-88% (w/w) of at least one polystyrene (co)polymer (A), more preferably 55-88% (w/w) of at least one polystyrene (co)polymer (A), even more preferably 60-85% (w/w) of at least one polystyrene (co)polymer (A), in particular 70-80% (w/w) of at least one polystyrene (co)polymer (A).

The polymer blend according to the present invention may comprise 10-50% (w/w) of at least one poly(lactic acid) (PLA). In a preferred embodiment, the polymer blend comprises 10-40% (w/w) of at least one PLA (B), preferably 10-30% (w/w) of at least one PLA, in particular 12-30% (w/w) of at least one PLA.

The polymer blend according to the present invention may comprise 0.5-20% (w/w) of at least one styrene methyl methacrylate copolymer (SMMA). In a preferred embodiment, the polymer blend comprises 1-15% (w/w) of at least one SMMA (C), preferably 2-10% (w/w) of at least one SMMA, in particular about 5% (w/w) of at least one SMMA.

The polymer blend according to the present invention may comprise 0-5% (w/w) of the at one or more additive(s). Preferably, the polymer blend comprises 0.1-5% (w/w) of at least one or more additive(s), more preferably 0.25-5% (w/w) of one or more additive(s), even more preferably 0.5-5% (w/w) of one or more additive(s).

Accordingly, the polymer blend may preferably comprise:
(A) 40-88.5% (w/w) of at least one polystyrene (co)polymer;
(B) 10-40% (w/w) of at least one PLA;
(C) 1-15% (w/w) of at least one SMMA; and,
(D) 0.5-5% (w/w) of one or more additive(s).

More preferably, the polymer blend may comprise:
(A) 50-88.5% (w/w) of at least one polystyrene (co)polymer;
(B) 10-30% (w/w) of at least one PLA;
(C) 1-15% (w/w) of at least one SMMA; and,
(D) 0.5-5% (w/w) of one or more additive(s).

In a more preferred embodiment, the polymer blend comprises:
(A) 55-87.5% (w/w) of at least one polystyrene (co)polymer;
(B) 10-30% (w/w) of at least one PLA;
(C) 2-10% (w/w) of at least one SMMA; and,
(D) 0.5-5% (w/w) of one or more additive(s).

Even more preferably, the polymer blend may comprise:
(A) 55-85.5% (w/w) of at least one polystyrene (co)polymer;
(B) 12-30% (w/w) of at least one PLA;
(C) 2-10% (w/w) of at least one SMMA; and,
(D) 0.5-5% (w/w) of one or more additive(s).

Even more preferably, the polymer blend may comprise:
(A) 60-82.5% (w/w) of at least one polystyrene (co)polymer;
(B) 12-30% (w/w) of at least one PLA;
(C) about 5% (w/w) of at least one SMMA; and,
(D) 0.5-5% (w/w) of one or more additive(s).

Highly preferably, the polymer blend comprises:
(A) 60-80% (w/w) of at least one polystyrene (co)polymer;
(B) 15-30% (w/w) of at least one PLA;
(C) about 5% (w/w) of at least one SMMA; and,
(D) 0-5% (w/w) of one or more additive(s).

Particularly preferably, the polymer blend comprises:
(A) 60-80% (w/w) of polystyrene (co)polymers, comprising
  (a) high impact polystyrene (HIPS), and
  (b) general purpose polystyrene (GPPS),
  wherein the mass ration of HIPS:GPPS is between 50:50 and 95:5, in particular between 75:25 and 95:5,
(B) 15-30% (w/w) of at least one PLA, in particular wherein the PLA has a melt flow index (MFI) of between 4 and 10 g/10 min (determined at a temperature of 210° C. and at a load of 2.16 kg according to ASTM procedure D1238)
(C) about 5% (w/w) of at least one SMMA, preferably wherein the SMMA contains at least 50% (w/w) styrene, in particular about 70% (w/w) styrene; and,
(D) 0-5% (w/w) of one or more additive(s).

As indicated above, it has surprisingly be found that styrene methyl methacrylate copolymer (SMMA) is suitable as a compatibilizer enabling blending polystyrene (co)polymer (A) and PLA (B).

Therefore, in another aspect, the present invention refers to the use of a styrene methyl methacrylate copolymer (SMMA) for compatibilizing a polymer blend comprising polystyrene (co)polymer (A) and PLA (B). The invention also relates to the use of a blend as described for preparing polymer products, such as films and packaging materials.

Herein the term "compatibilizing" may be understood in the broadest sense as improving the miscibility of two or more components in the polymer blend, in particular of those components which are purely miscible upon blending and/or separate into two or more phases microscopically observable (i.e., larger than 0.1 mm in size) upon processing. The styrene methyl methacrylate copolymer (SMMA) is used as a compatibilizer enabling to blend the purely miscible components in order to, exemplarily, gain stability.

In the context of using SMMA as a compatibilizer according to a preferred embodiment of the present invention, the polymer blend is characterized according to the present invention as laid out above.

SMMA may be used as a compatibilizer in a polymer blend by any means known in the art. Exemplarily, SMMA is admixed to polymer blend raw materials also comprising polystyrene (co)polymer and PLA before blending these components with another, followed by blending these components.

Herein, blending the components may be performed by extruding the components. Preferably, the components are heated during they are blended, more preferably heated above their glass transition temperature (Tg).

The polymer blend according to the present invention may be prepared by any means known in the art.

In a still further aspect, the present invention refers to a method of producing a polymer blend according to the present invention comprising the steps of:
(i) blending the following components
(A) at least one polystyrene (co)polymer;
(B) at least one PLA,
(C) at least one SMMA, and optionally
(D) one or more additive(s),
under conditions allowing said components to form an essentially homogeneous molding composition, in particular wherein said components are characterized as indicated above; and
(ii) hardening the polymer blend obtained from step (i).

Blending the component according to step (i) may be performed by any means known in the art. Exemplarily, the step (i) of blending the components may be performed by extruding the components. Preferably, the components are heated during they are blended, more preferably heated above their glass transition temperature (Tg).

Subsequently, the blend is preferably cooled below the glass transition temperature (Tg) of the components.

Therefore, in a preferred embodiment, in the method according to the present invention, step (i) comprises the heating of the components or the molding composition above the glass transition temperature (Tg); and step (ii) comprises cooling the polymer blend below the glass transition temperature (Tg) of the polymer blend.

As indicated above, the polymer blend according to the present invention is comparably tough, elastic and ductile. Accordingly, such polymer blend may very well be used for the production of any product producible from a tough, elastic and ductile plastic.

Accordingly, a further aspect of the present invention relates to a product, comprising the polymer blend, wherein said product, in particular polymer product, is selected from the group consisting of:
(i) film material,
(ii) packing material,
(iii) a plastics molding,
(iv) fiber or yarn,
(v) foam,
(vi) a fabric or tissue,
(vii) a composite
(viii) micro- or nanobeads, and
(ix) an implant,
preferably, wherein said polymer blend constitutes for more than 50% (w/w), more preferably for more than 60% (w/w) of said product.

In this context, even more preferably, the polymer blend constitutes for more than 70% (w/w), even more preferably for more than 80% (w/w), even more preferably for more than 90% (w/w) of such product, in particular wherein such product essentially consists of a polymer blend according to the present invention.

Producing one or more of such products may be performed by any means known in the art. Exemplarily, by extrusion, injection molding, casting, blow molding, spraying, spinning, rolling, weaving, forming a suspension from an emulsion etc. or a combination of two or more thereof. The person skilled in the art will know which method(s) to apply for producing the respective product.

The term "film material" as used herein may be understood in the broadest sense as any thin and flexible material. Preferably, the film material has a thickness of less than 5 mm, more preferably of less than 2 mm, even more preferably of less than 1 mm, in particular of not more than 0.5 mm. Preferably, but not necessarily, the film material is pellucid. The film material may be used for any purpose such as, exemplarily, for packing goods (e.g., foods, beverages, food or beverage containers, consumer goods, books, clothes, electrics etc.) or may be used as plastic bags, slides, stickers, blister packing etc. Exemplarily, a film material may be produced by blow molding or rolling.

As used herein, the term "packing material" may be understood in the broadest sense as any product for packing. Packing material may be a film material or may be a less flexible material of a higher thickness such as, e.g., a food or beverage container, a blister packing, tableware etc. Exemplarily, a packing material may be produced by blow molding, extrusion, injection molding or rolling.

The term "plastics molding" as used herein may be understood in the broadest sense as producing any shaped piece. Exemplarily, a plastics molding may be produced by extrusion, injection molding or rolling.

Exemplarily, a fiber or yarn may be produced in a way including spinning, rolling, weaving and may, then, optionally, be subjected to weaving forming a fabric or tissue.

A composite may be any composite in the art. Preferably, a composite may further comprise one or more layers of a metal or alloy, one or more layers of other plastic material(s) and/or one or more layer(s) of cardboard. Preferably, a composite may further comprise one or more metal or alloy film(s), one or more films of other plastic material(s) or a thin cardboard of not more than 1.5 mm in thickness. Then, exemplarily, a liquid packaging board may be produced.

Micro- or nanobeads may exemplarily be formed generating a suspension from an emulsion or by spraying. Micro- or nanobeads and/or an implant may also comprise one or more pharmaceutically active agent(s) including drugs, growth factors etc. Micro- or nanobeads and/or an implant may be coated by another pharmaceutically acceptable polymer.

The invention is further explained by the following examples and patent claims.

EXAMPLES

Preparing of the PS-PLA-Blends

The PLA material was obtained from NatureWorks® LLC (Minnetonka, USA) as general purpose extrusion grade product Ingeo Biopolymer 2002D (specific gravity 1.24; tensile strength at break of 53 MPa; Melt Flow Rate (ASTM D1238) of 5-7).

The HIPS and GPPS were provided by Styrolution, LLC (USA) as:

PS 6200 (polystyrene with Mw of 207,000 g/Mol; Melt Flow Rate (ASTM D1238, 200° C. and 5 kg) of 3.1) and PS 1600 (polystyrene with Mw of 240,000 g/Mol; Melt Flow Rate (ASTM D1238) of 6), respectively.

The SMMA used was a random copolymer of 70% styrene and 30% methyl methacrylate (NAS30 with Mw of 187,000 g/Mol; Melt Flow Rate (ASTM D1238) of 2.2).

Mixtures of HIPS (diluted with GPPS), PLA, and SMMA were compounded using a single screw 0.75 inch extruder with zone temperatures set from 160 to 200° C. The melt was passed through a die plate to form strands roughly 3 mm in diameter. Polymer strands were passed through a water bath to cool them and then the cooled polymer was cut into pellets roughly 3 mm in length. The pellets were then passed through the same extruder a second time to insure thorough compounding.

Pellets of the compounded blend were injection molded at from 160 to 180° C. into Type I tensile bar specimen. The specimens were tested for ductility and toughness by stressing the specimen in tension according to ASTM procedure D638. Specimen were also tested for impact resistance according to ASTM D256 for notched Izod impact strength and D5420 for Gardner impact strength. The ASTM procedures D638, D256 and D5420 were used in the versions which were up-to-date end of 2013.

Table 1 illustrates the beneficial effect of the SMMA on mechanical properties of the polystyrene/PLA blend. At low PLA content, the SMMA has neutral to a slight negative effect on mechanical properties. However, at higher PLA contents (15% and 25%), the mechanical properties are clearly benefited by the SMMA. This illustrates that the SMMA itself has no inherit benefit in this case, except for its significant improvement in the compatibilization of the HIPS and PLA.

Notably, the polymer blends shown in Table 1 with and without SMMA each contain the same amounts of rubber (from the HIPS) and PLA. Therefore, the demonstrated effect does not result from different amounts of rubber or PLA. It has been demonstrated that admixing SMMA has a beneficial effect on the properties of polystyrene (co)polymer/PLA blends.

It has been demonstrated that at PLA contents above 5% (w/w), the admixing of SMMA to the composition bears beneficial technical effects, such as an improvement in notched Izod impact strength, in ultimate elongation, in tensile energy to break and Gardner impact strength.

TABLE 1

Improvement in energy to break with addition of styrene methyl methacrylate (SMMA) to polylactic acid biopolymer (Ingeo 2002D).

| | | Without SMMA | | | |
|---|---|---|---|---|---|
| HIPS 6200 | % | 65 | 65 | 65 | 65 |
| SMMA | % | 0 | 0 | 0 | 0 |
| PLA 2002D | % | 0 | 5 | 15 | 25 |
| GPPS 1600 | % | 35 | 30 | 20 | 10 |
| Total | % | 100 | 100 | 100 | 100 |
| Notch Izod impact strength | ft-lb/in | 3.0 | 2.2 | 0.9 | 0.7 |
| Gardner impact strength | in-lb | 30 | 29 | 7 | 3 |
| Tensile strain at break | % | 31 | 32 | 29 | 34 |
| Tensile modulus | kpsi | 394 | 392 | 384 | 384 |
| Tensile stress at break | psi | 3807 | 3684 | 3104 | 3198 |
| Tensile stress at yield | psi | 3849 | 3858 | 3739 | 3737 |
| Energy to break | in-lbf | 133 | 133 | 114 | 127 |
| Ultimate elongation | % | 40 | 37 | 31 | 27 |
| Energy to break (rounded) | In-lbf | 360 | 330 | 240 | 200 |
| | | With SMMA | | | |
| HIPS 6200 | % | 65 | 65 | 65 | 65 |
| SMMA | % | 5 | 5 | 5 | 5 |
| PLA 2002D | % | 0 | 5 | 15 | 25 |
| GPPS 1600 | % | 30 | 25 | 15 | 5 |
| Total | % | 100 | 100 | 100 | 100 |
| Notch Izod impact strength | ft-lb/in | 2.8 | 1.9 | 1.2 | 1.2 |
| Gardner impact strength | in-lb | 34 | 21 | 16 | 6 |
| Tensile strain at break | % | 30 | 27 | 33 | 37 |
| Tensile modulus | kpsi | 392 | 405 | 398 | 390 |
| Tensile stress at break | psi | 3842 | 3408 | 3496 | 3324 |
| Tensile stress at yield | Psi | 3870 | 3846 | 3859 | 3810 |
| Energy to break | in-lbf | 137 | 125 | 132 | 143 |
| Ultimate elongation | % | 38 | 38 | 34 | 31 |
| Energy to break (rounded) | In-lbf | 340 | 320 | 280 | 250 |

The invention claimed is:

1. A polymer blend comprising:
   (A) 60-88% (w/w) of at least one polystyrene (co)polymer, other than styrene methyl methacrylate copolymer (SMMA), wherein said at least one polystyrene (co) polymer comprises:
      (A1) more than 50% (w/w) high impact polystyrene (HIPS), and
      (A2) general purpose polystyrene (GPPS),
      wherein the HIPS:GPPS mass ratio is in the range of to 95:5;
   (B) 10-30% (w/w) of at least one poly(lactic acid) (PLA);
   (C) 2-10% (w/w) of at least one styrene methyl methacrylate copolymer (SMMA) comprising at least 50% (w/w) styrene; and optionally
   (D) 0-5% (w/w) of one or more additive(s).

2. The polymer blend according claim 1, wherein the at least one polystyrene (co)polymer (A) further comprises a polystyrene (co)polymer selected from the group consisting of polystyrene, styrene acrylonitrile copolymer (SAN), acrylonitrile butadiene styrene copolymer (ABS), styrene butadiene copolymer (SB), styrene maleimide copolymer (SMC), styrene alpha-methylstyrene copolymer and mixtures of two or more thereof.

3. The polymer blend according to claim 1, wherein the at least one poly(lactic acid) (PLA) (B) has a melt flow index (MFI) of between 4 and 10 g/10 min (determined at a temperature of 210° C. and at a load of 2.16 kg according to ASTM procedure D1238).

4. The polymer blend according to claim 1, wherein the at least one styrene methyl methacrylate copolymer (SMMA) (C) is a random polymer.

5. The polymer blend according to claim 1, wherein said polymer blend comprises about 5% (w/w) of at least one SMMA (C).

6. The polymer blend according to claim 1, said blend comprising:
   (A) 60-82.5% (w/w) of at least one polystyrene (co) polymer (A);
   (B) 12-30% (w/w) of at least one PLA (B);
   (C) about 5% (w/w) of at least one SMMA (C); and
   (D) 0.5-5% (w/w) of one or more additive(s) (D).

7. The polymer blend according to claim 1, wherein at least a part of the HIPS is a styrene butadiene block copolymer (SBC).

8. The polymer blend according to claim 1, wherein at least a part of the HIPS is a styrene butadiene block copolymer (SBC) and the SBC has a dendrimer structure.

9. The polymer blend according to claim 1, wherein said polymer blend comprises 12-30% (w/w) of at least one PLA (B).

10. The polymer blend according to claim 1, wherein the HIPS:GPPS mass ratio is in the range of 60:40 to 95:5.

11. The polymer blend according to claim 1, wherein the HIPS:GPPS mass ratio is in the range of 70:30 to 95:5.

12. The polymer blend according to claim 1, wherein the HIPS:GPPS mass ratio is in the range of 75:25 to 95:5.

13. A method of producing a polymer blend according to claim 1 comprising the steps of:
   (i) blending the following components
      (A) at least one polystyrene (co)polymer;
      (B) at least one poly(lactic acid) PLA;
      (C) at least one styrene methyl methacrylate copolymer SMMA; and optionally
      (D) one or more additive(s),
      under conditions allowing said components to form an essentially homogeneous molding composition; and
   (ii) hardening the polymer blend obtained from step (i).

14. The method according to claim 13, wherein:
   step (i) comprises the heating of the components or the molding composition above the glass transition temperature (Tg); and
   step (ii) comprises cooling the polymer blend below the glass transition temperature (Tg) of the polymer blend.

15. A product, comprising the polymer blend according to claim 1, wherein said product is selected from the group consisting of:
   (i) film material,
   (ii) packing material,
   (iii) a plastics molding,
   (iv) fiber or yarn,
   (v) foam,
   (vi) a fabric or tissue,
   (vii) a composite,
   (viii) micro- or nanobeads, and
   (ix) an implant.

16. The product according to claim 15, wherein said polymer blend constitutes for more than 50% (w/w) of said product.

* * * * *